United States Patent [19]

Koliba et al.

[11] 4,217,831
[45] Aug. 19, 1980

[54] CHOCK DEVICE FOR A TRANSPORTING VEHICLE

[75] Inventors: Melvin J. Koliba, Plymouth; Clarence D. Oakes, Jr., Troy; Larry P. Napel, Hamburg, all of Mich.

[73] Assignee: General Motors Corporation, Detroit, Mich.

[21] Appl. No.: 965,237

[22] Filed: Dec. 1, 1978

[51] Int. Cl.² .................. B60P 7/10; B61D 45/00; B65J 1/22
[52] U.S. Cl. .................................................. 410/121
[58] Field of Search ............... 105/366 B, 366 E, 367, 105/463, 464, 465, 475

[56] References Cited

U.S. PATENT DOCUMENTS

| | | | |
|---|---|---|---|
| 3,160,117 | 12/1964 | Willison et al. ................. | 105/366 E |
| 3,545,713 | 12/1970 | Mowatt-Larssen et al. ........ | 105/465 |
| 3,584,824 | 6/1971 | Belcer ........................... | 105/366 B X |
| 3,593,387 | 6/1977 | Georgi ........................... | 24/221 |
| 3,612,466 | 10/1971 | Arnold .......................... | 105/366 B X |
| 3,737,135 | 6/1973 | Bertolini ....................... | 105/366 B X |
| 3,883,107 | 5/1975 | Ashworth et al. ................ | 105/367 |
| 4,102,274 | 7/1978 | Feary et al. ................... | 105/367 |

Primary Examiner—John J. Love
Assistant Examiner—Howard Beltran
Attorney, Agent, or Firm—Edward J. Biskup

[57] ABSTRACT

A chock device that is releasably connected to a railway freight car floor supported apertured bar which forms a part of a transporter and includes a lock head that is insertable into a complimentary hole in the bar and can be rotated to a locked position after which the lock head is raised upwardly through a camming arrangement so as to maintain the chock device in firm engagement with the bar.

2 Claims, 5 Drawing Figures

CHOCK DEVICE FOR A TRANSPORTING VEHICLE

This invention relates to restraint devices in general and more particularly concerns a chock device that can be releasably connected to the railway freight car floor portion of a transporter for preventing cargo from shifting while the transporter is moving.

More specifically, the present invention concerns a chock device adapted to be fixedly connected to an elongated bar secured to the railway freight car floor portion of a transporter for maintaining cargo in a fixed position while the transporter is in transit. The elongated bar is formed with a plurality of identical equally spaced oblong holes located in axial alignment along the longitudinal axis of the bar. The chock device comprises a body portion which includes an upright member for engaging the cargo and a rigidly connected horizontal member which is adapted to overlie the elongated bar. The bottom portion of the horizontal member rigidly carries a projection having a configuration which corresponds to the configuration of the holes in the bar so as to allow the projection to be selectively located in one of the holes and substantially fill the latter. In addition, a rotatable lock head extends through the horizontal member and is adapted to register with and be located in another of the holes in the bar when the horizontal member is positioned onto the bar. The lock head has an eliptical shape which allows it to pass through the accommodating hole in the bar and prevents it from being removed from the bar when it is rotated approximately 90°. A lever is attached to the upper end of the lock head for rotating the latter into the locked position, and cam means are provided for moving the lock head towards the horizontal member so when the lock head is in the locked position it serves to maintain the body portion in a locked position with the bar.

The objects of the present invention are to provide a new and improved chock device that is releasably connected to a floor supported apertured bar which forms a part of a transporter and includes a lock head that is insertable into a complimentary hole in the bar and can be rotated to a locked position after which the lock head is raised upwardly so as to maintain the chock device in firm engagement with the bar; to provide a new and improved chock device having a body portion provided with a rotatable lock head that cooperates with at least one projection fixed to the body portion for securing and positioning the chock device in an apertured support bar fixed with the floor of a transporter; to provide a new and improved chock device having a lock head which is maintained in a raised position through a cam arrangement for firmly connecting the chock device to an apertured floor of a transporter and in which the lock head can be manually lowered by virtue of the cam arrangement so as to facilitate removal of the chock device from the floor; and to provide a new and improved chock device for a transporter that is adapted to be connected to a floor supported elongated bar having a plurality of uniformly spaced and identical holes and that includes a lock head rotatably supported in a body portion which comprises an upright member for engaging cargo and a horizontal member provided with a plurality of fixed projections which together with the lock head are adapted to extend into longitudinally spaced holes in the bar for locating and fixing the chock device to the floor of the transporter.

Other objects and advantages of the invention will be more apparent from the following detailed description when taken with the drawings in which.

Figure 1:
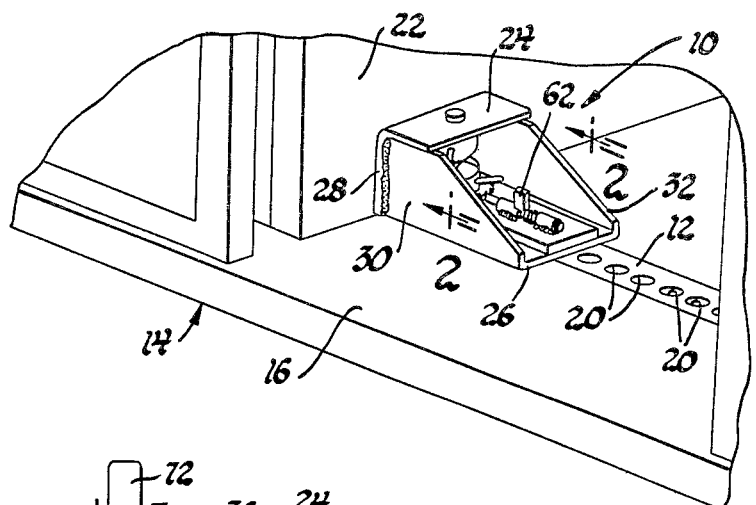
FIG. 1 is a perspective view showing a chock device made in accordance with the invention and connected to the floor portion of a transporter.

Referring to the drawings and more particularly FIG. 1 thereof, a chock device 10 made in accordance with the invention is shown overlying an elongated bar 12 which extends parallel to the longitudinal axis of a railway freight car 14 and is located along one side thereof. Although not shown, axially spaced points of the bar 12 are secured to the floor portion 16 of the freight car 14 above an elongated channel 18 formed in the floor portion so as to provide an open space beneath the bar 12. In addition, the bar 12 is formed with a plurality of equally spaced and identical elliptical holes 20 which are aligned along the longitudinal center axis of the bar 12. The chock device 10 is adapted to cooperate with the bar 12 for restraining from movement cargo 22 carried within the freight car 14. It will be understood that another bar, such as the bar indicated by reference numeral 12, is positioned in the floor portion 16 of the freight car 14 along the other side thereof. It is quite common to have such bars fixed with the floor portion of freight cars with each of the bars extending the full length of the car.

Figure 2:
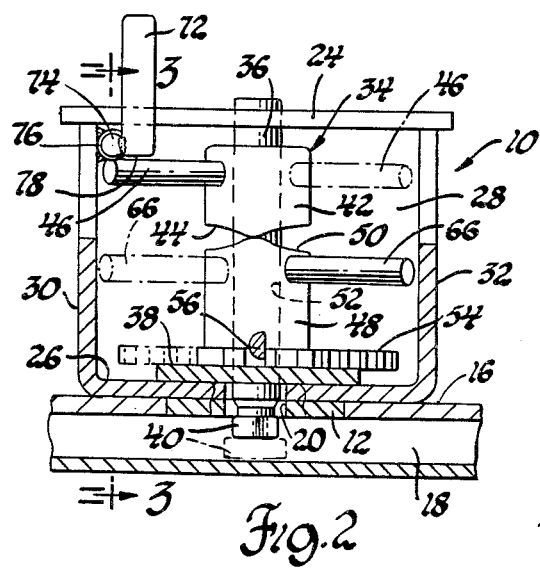
FIG. 2 is an enlarged sectional view of the chock device taken on lines 2—2 of FIG. 1.
Figure 3:
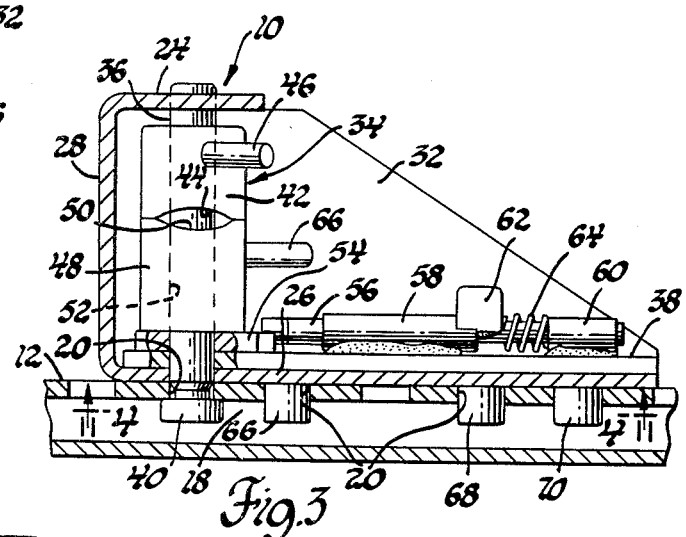
FIG. 3 is a side view of the chock device taken on lines 3—3 of FIG. 2.

As seen in FIGS. 2 and 3, the chock device 10 comprises a body portion which includes upper and lower horizontal members 24 and 26, respectively, which are integrally connected with an upright front wall member 28. In addition, the body portion includes a pair of laterally spaced triangular side walls 30 and 32 which serve to rigidly interconnect the upper and lower horizontal members 24 and 26 and the front wall member 28.

Centrally located between the side walls 30 and 32 is a lock member 34 which includes a vertically oriented cylindrical pin 36, the upper end of which is rotatably supported by the upper horizontal member 24. The lower end of the pin 36 extends through a rectangular plate member 38 which is fixed with the lower horizontal member 26. The lower end of the pin also extends through the horizontal member 26 and is formed with a lock head 40 which is eliptical in configuration and substantially corresponds in shape and size with each of the holes 20 formed in the bar 12. An upper portion of the pin 36 is rigidly connected with and supports a cylindrical upper cam member 42 which has a wave type cam surface 44 at its lower end provided with a pair of diametrically opposed lobe portions and a pair of diametrically opposed valley portions. A lever 46 extends laterally outwardly from the cam member 42 and is rigidly fixed thereto.

A cylindrical lower cam member 48 is located below the upper cam member 42 and also has a similar wave type cam surface 50 at its upper end which cooperates with the cam surface 44 of the upper cam member 42 as will be explained hereinafter. The lower cam member 48 has a cylindrical bore 52 centrally formed therein along its longitudinal axis which rotatably accommodates the lower portion of pin 36. Thus, the pin 36 is rotatable relative to the lower cam member 48 without causing corresponding rotation thereof.

The lower end of the lower cam member 48 is fixed with a ratchet wheel 54 having a plurality of equally spaced identical teeth formed thereon which cooperate with a pawl 56 that is mounted for longitudinal movement within a pair of axially aligned support sleeves 58 and 60 fixed with the plate member 38. The pawl 56 is integrally formed with an upwardly extending tab 62 which is finger-operated for moving the pawl rearwardly against the bias of a coil spring 64 so as to release the pawl from engagement with the ratchet wheel 54. As in the case with the upper cam member 42, the lower cam member 44 is rigidly formed with a laterally extending lever 66 which is manually operated for rotating the lower cam member 44 about the pin 36 of the lock member.

It will be noted that the lower surface of the lower horizontal member 26 is rigidly formed with three projections 66, 68 and 70 which are identical in size and conform in shape and size with each of the holes 20 in the bar 12. Also, the spacing between the center of each projection 68 and 70 as well as the spacing between the center of lock head 40 and the center of projection 66 is the same as the spacing between the centers of adjacent holes 20 in the bar 12.

Figure 4:
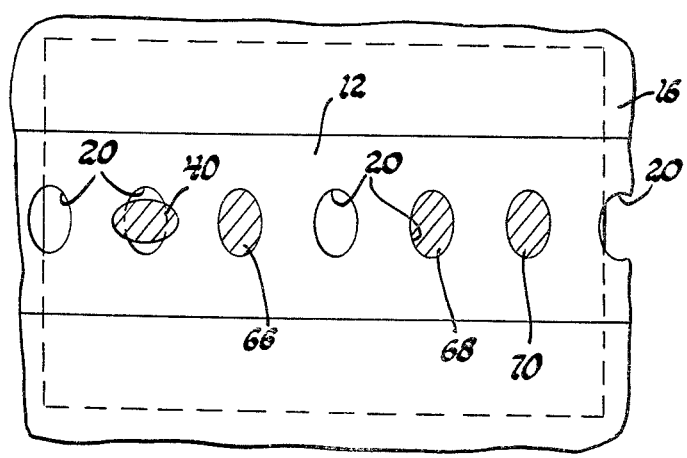
FIG. 4 is a view taken on lines 4—4 of FIG. 3 and shows the apertured support bar fixed with the floor portion of the transporter.

It should be apparent from the above description that when the chock device 10 is used as a stop member for preventing movement of cargo in a transporter, it is placed over the bar 12 with the projections 66, 68 and 70 and the lock head 40 extending through accommodating holes 20 in the bar 12 as seen in FIGS. 3 and 4. During such time, the lock head 40 is located with its major axis extending transversely to the longitudinal axis of the chock device 10 so that the lock head 40 can be inserted through one of the holes 20 in the bar 12. This positioning of the lock head 40 is realized by manually grasping the lever 46 and moving the latter 90° together with the upper cam member 42 so the lever 46 is located in the phantom line position shown in FIG. 2. When this is done, the lobe portion of the upper cam member 42 moves off the lobe portion of the lower cam member 48 causing the lock head 40 to drop downwardly relative to the lower horizontal member to the phantom line position shown in FIG. 2. Afterwards, the tab 62 is pulled rearwardly so as to release the pawl 56 from locking engagement with the teeth on the ratchet wheel 54 and simultaneously the lever 66 is moved to the phantom line position of FIG. 2 causing rotation of the lower cam member 48 by 90° about the pin 36 so that the lobes on cam surface 50 once again engage the lobes of cam surface 44. This causes the lock head to be raised and return to the full line position. Once the chock device 10 is properly positioned in the bar 12 with its upright wall member 28 engaging the cargo 22 as seen in FIG. 1, the lever 46 is once again grasped and moved to the full line position so that the lock head 40 has its major axis located parallel to the longitudinal axis of the chock device 10 as seen in FIG. 4. This is followed by returning the lever 66 and the lower cam member 48 to the full line position of FIG. 2 at which time the lobes on the cam surface 50 again register with the lobes of the cam surface 44. As a result, the lock head 40 is again raised upwardly to the full line position shown in FIGS. 3 and 4 and provides firm engagement between the lock head 40 and the lower surface of the bar 12. As should be apparent, when the lower cam member 48 is returned to the full line position of FIG. 2, the teeth of ratchet wheel 54 automatically move the pawl 56 against the spring 64 and automatic locking engagement occurs between the two. As is conventional, the ratchet wheel and pawl arrangement allows free movement of the cam member 48 in one direction only except when the pawl is released.

Figure 5:
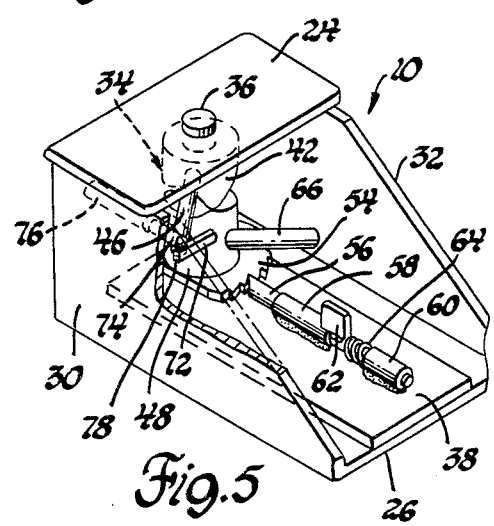
FIG. 5 is a perspective view with a part partially broken away so as to show more clearly the various parts of the chock device.

It should be noted that once the chock device 10 is in the locked condition of FIGS. 2-4, a lock lever 72 can be rotated downwardly from the FIG. 2 position to the FIG. 5 position into a blocking position relative to the lever 46 so as to prevent the latter from moving from the full line position. The lock lever 72 is rigid with a shaft 74 which is rotatably received within a sleeve 76 fixed to side wall 30. The end 78 of the lever 72 contacts the side wall 30 when the lever is in the blocking position and prevents further downward movement of the lever 72.

After the freight car reaches its destination, the chock device 10 can be released from the bar 12 by initially releasing the pawl 56 from locking engagement with the ratchet wheel 54 after which the lever 66 is moved to the phantom line position of FIG. 2. This movement causes the lock head 40 to again drop to the phantom line position after which the lever 46 of the upper cam member 42 is moved to the phantom line position so as to once again position the major axis of the lock head 40 in line with the major axis of the accommodating hole 20 so that the entire chock device 10 can be removed from the bar 12.

Various changes and modifications can be made in this construction without departing from the spirit of the invention. Such changes and modifications are contemplated by the inventors and they do not wish to be limited except by the scope of the appended claims.

The embodiments of the invention in which an exclusive property or privilege is claimed are defined as follows:

1. A chock device adapted to be fixedly connected to an elongated bar secured to the floor portion of a transporter for preventing cargo from shifting while the transporter is moving, said bar being formed with a plurality of equally spaced oblong holes along its longitudinal length, said chock device comprising a body portion including an upright member for engaging the cargo and a rigidly connected horizontal member for overlying the bar, at least one projection fixed to said horizontal member and having a configuration which allows said projection to be located within one of said oblong holes and substantially fill the latter, a rotatable lock head extending through said horizontal member and adapted to register with and be located in another of said holes in said bar when the horizontal member overlies said bar, said lock head having an eliptical shape which allows the lock head to pass through said another of said holes in said bar when the lock head is in one position and prevents said lock head from being removed from said bar when said lock head is rotated to a second position, a manually operable lever for rotating said lock head between said first and second positions, and cam means for moving said lock head towards said horizontal member so when said lock head is in said another of said holes and is located in said second position the lock head serves to maintain said body portion in firm contact with said bar.

2. A chock device adapted to be fixedly connected to an elongated bar secured to the floor portion of a transporter for preventing cargo from shifting while the transporter is moving, said elongated bar being formed with a plurality of equally spaced oblong holes along its longitudinal length, said chock device comprising a body portion including an upright member for engaging the cargo and a rigidly connected horizontal member for overlying the elongated bar, at least one projection fixed to the lower surface of said horizontal member and having a configuration which allows said projection to be located within one of said oblong holes and substantially fill the latter, a rotatable lock member including a cylindrical pin supported by and extending through said horizontal member and having a lock head at its lower end adapted to register with and be located in another of said holes in said elongated bar when the horizontal member overlies said elongated bar, said lock head having an eliptical shape which allows the lock head to pass through said another of said holes in said elongated bar when the lock head is in one position and prevents said lock head from being removed from said bar when said lock head is rotated to a second position, a manually operable lever for rotating said lock head between said first and second positions, said lock member including upper and lower cam members, the upper cam member being rigidly connected to an upper portion of said pin and said lower cam member being carried by said pin for relative rotational movement, a ratchet wheel fixed with the lower end of the lower cam member, a pawl supported by the body portion and continuously movable into engagement with said ratchet wheel for preventing rotational movement of the ratchet wheel in one direction, cooperating cam surfaces formed on said upper and lower cam members for moving said lock head towards said horizontal member so when said lock head is in said another of said holes and is located in said second position the lock head serves to maintain said body portion in form contact with said elongated bar, and a lock lever pivotally supported by said body portion and adapted to be moved into a blocking position relative to said manually operable lever when the lock head is in said second position.

* * * * *